Figures 1, 2:
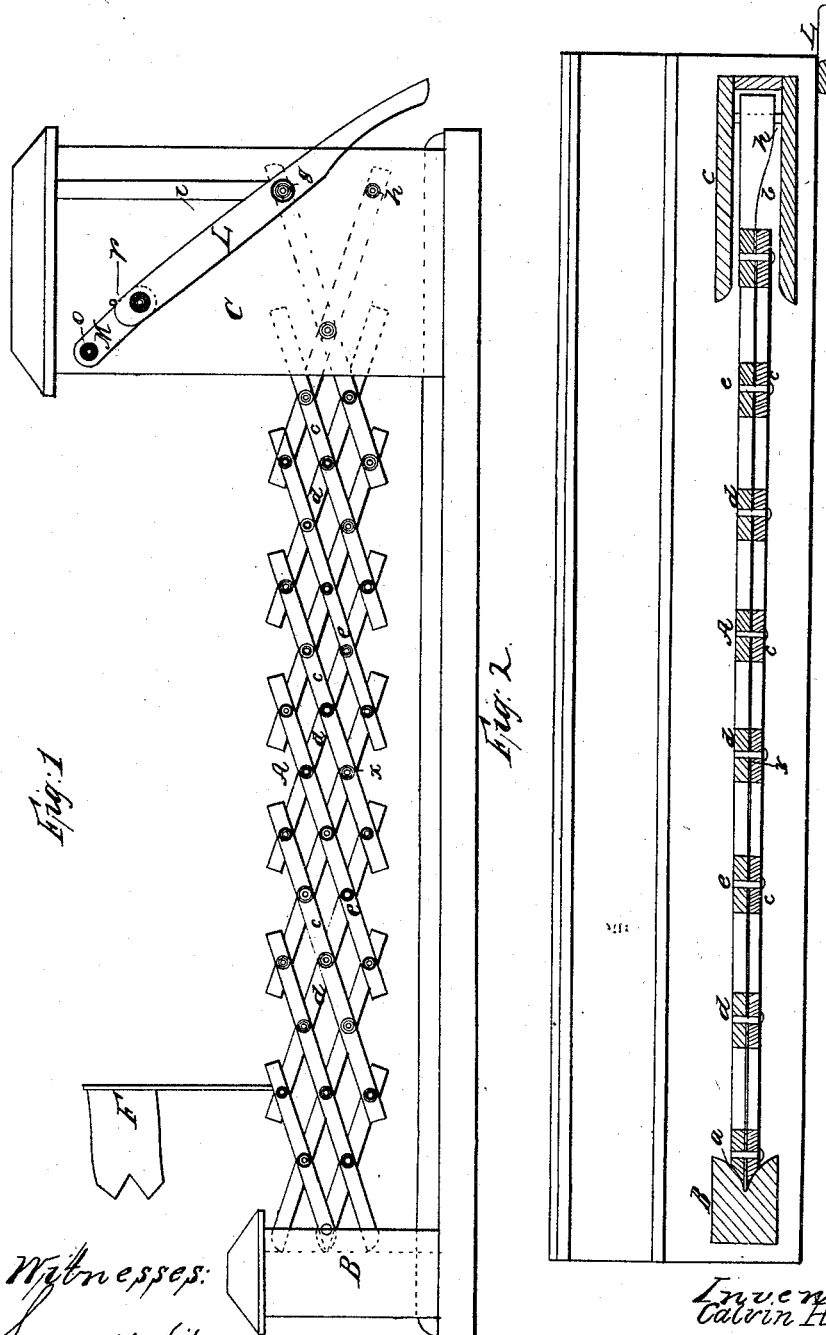

C. H. PAINE.
GATE.

No. 65,591. Patented Aug. 13, 1867.

Witnesses:
Samuel N. Piper
Geo. H. Andrews

Inventor:
Calvin H. Paine.
by his attorney
R. H. Eddy

United States Patent Office.

CALVIN H. PAINE, OF PROVIDENCE, RHODE ISLAND, ASSIGNOR TO HIMSELF AND WILLIAM D. HILTON, OF SAME PLACE.

*Letters Patent No. 65,591, dated June 11, 1867.*

IMPROVEMENT IN GATES.

*The Schedule referred to in these Letters Patent and making part of the same.*

TO ALL PERSONS TO WHOM THESE PRESENTS SHALL COME:

Be it known that I, CALVIN H. PAINE, of the city and county of Providence, and State of Rhode Island, have invented an improved Folding Gate for railway crossings and other situations; and I do hereby declare the same to be fully described in the following specification, and represented in the accompanying drawings, of which—

Figure 1 is a side elevation, and

Figure 2 a horizontal section of it.

In such drawings, A denotes the gate, and B and C its two posts, each of such posts being chambered (as shown at $a\ b$) from top to bottom, and both chambers being made so as to open toward each other, in order that they may receive the gate, and allow of its movements both into and out of such chambers. The gate is made on the principle of the "lazy-tongs," that is to say, it consists of two series of parallel bars, $c\ c\ c$, &c.; $d\ d\ d$, &c., those of one series being arranged so as to cross those of the other obliquely. A joint-pin, $e$, at each crossing goes through the two bars of such crossing and a separating-block or washer, $x$, arranged between the bars at the crossing. This washer is to keep the bars apart, so as to prevent ice from accumulating between them so as to impede the working of the gate. The series of bars so connected can be stretched asunder or contracted, as circumstances may require. The gate so made is placed within the chamber of one of the posts, and is connected to the post by two pins $g\ h$ going through the gate and the post. The upper of such pins is inserted in a vertical slot, $i$, made in the post, as shown in the drawings. The pin $g$ constitutes the fulcrum of a lever, L, arranged against the post. This lever, at its inner end, is jointed to a toggle, M, which, at its upper end, turns on a pin or bolt, $o$, inserted in the post. When the gate is closed the toggle brings up against a stop or stud, $p$, projecting from the post, the whole being arranged as represented. By taking hold of the lever L and moving it, the gate may be either thrown from one post to the other, or it may be drawn back wholly within the larger post. To one of the end bars of the gate I affix a signal flag, F. This flag, when the gate is in a contracted state, will project in an inclined position from the post within which the gate may be. When the gate is projected across a crossing, the lever and toggle, by their action with the stud, will prevent the gate from being contracted, which it cannot be until the lever is laid hold of and moved on its fulcrum.

I do not claim the principle of the lazy-tongs, but what I claim as my invention is as follows:

I claim the combination of the chambered posts or their equivalents and the folding gate made of the crossed bars, connected as described.

I also claim the combination of the chambered posts or their equivalents, the folding gate, and mechanism, substantially as described, for operating such gate, in manner as explained.

CALVIN H. PAINE.

Witnesses:
R. H. EDDY,
GEO. H. ANDREWS.